(12) United States Patent  
Chiang

(10) Patent No.: US 8,356,323 B2
(45) Date of Patent: Jan. 15, 2013

(54) UPNP/DLNA COMPLIANT MR-DVR

(75) Inventor: Ryan P. Chiang, Johns Creek, GA (US)

(73) Assignee: Cisco Technology, Inc., San Jose, CA (US)

( * ) Notice: Subject to any disclaimer, the term of this patent is extended or adjusted under 35 U.S.C. 154(b) by 933 days.

(21) Appl. No.: 12/103,013

(22) Filed: Apr. 15, 2008

(65) Prior Publication Data
US 2009/0260042 A1 Oct. 15, 2009

(51) Int. Cl.
H04N 7/18 (2006.01)
H04N 7/173 (2011.01)
H04N 7/16 (2011.01)
(52) U.S. Cl. ........... 725/80; 725/133; 725/141; 725/153
(58) Field of Classification Search .................... 725/80, 725/131, 133, 141, 153
See application file for complete search history.

(56) References Cited

U.S. PATENT DOCUMENTS

| | | | |
|---|---|---|---|
| 7,099,951 B2 * | 8/2006 | Laksono | 709/227 |
| 7,295,518 B1 | 11/2007 | Monk et al. | 370/235 |
| 2003/0093804 A1 | 5/2003 | Chang et al. | 725/95 |
| 2003/0217136 A1 | 11/2003 | Cho et al. | 709/223 |
| 2004/0034877 A1 | 2/2004 | Nogues | 725/151 |
| 2004/0133704 A1 * | 7/2004 | Krzyzanowski et al. | 709/227 |
| 2005/0138192 A1 | 6/2005 | Encarnacion et al. | 709/230 |
| 2005/0198684 A1 | 9/2005 | Stone et al. | 725/111 |
| 2005/0276226 A1 | 12/2005 | Musser et al. | 370/241 |
| 2006/0072618 A1 | 4/2006 | Moribe et al. | 370/474 |
| 2006/0117354 A1 * | 6/2006 | Schutte et al. | 725/142 |
| 2007/0050823 A1 * | 3/2007 | Lee et al. | 725/78 |
| 2007/0101024 A1 * | 5/2007 | Doumuki et al. | 709/246 |
| 2007/0130254 A1 | 6/2007 | Russ et al. | 709/203 |
| 2007/0180473 A1 * | 8/2007 | Song et al. | 725/78 |
| 2007/0211632 A1 | 9/2007 | Song et al. | 370/230 |
| 2007/0286569 A1 * | 12/2007 | Jung et al. | 386/64 |
| 2009/0106801 A1 * | 4/2009 | Horii | 725/91 |

FOREIGN PATENT DOCUMENTS

| | | |
|---|---|---|
| EP | 1 742 153 A1 | 1/2007 |
| WO | WO 00/45590 A1 | 8/2000 |
| WO | WO 2004/102344 A2 | 11/2004 |
| WO | WO 2006/023610 A1 | 3/2006 |
| WO | WO 2007/063408 A2 | 6/2007 |

OTHER PUBLICATIONS

"Connected Living—Enjoy high definition multimedia, everywhere." NXP Semiconductors. NXP B.V., Dec. 2006. Web. Oct. 18, 2010. <http://www.nxp.com/acrobat_download2/literature/9397/75015861.pdf>.*
International Search Report dated Jul. 1, 2009 cited in Application No. PCT/US2009/040657.
European Office Action dated May 23, 2012 cited in Application No. 09 731 825.7, 5 pgs.

* cited by examiner

Primary Examiner — Pankaj Kumar
Assistant Examiner — Randy Flynn
(74) Attorney, Agent, or Firm — Merchant & Gould

(57) ABSTRACT

A method for operably connecting MR-DVR legacy systems with DLNA/UPnP compliant devices. An embodiment comprises an MR-DVR server translating DLNA/UPnP compliant protocols/data format to legacy protocols/data format used by MR-DVR legacy client devices.

32 Claims, 18 Drawing Sheets

| Bytes | |
|---|---|
| 1 | FrameFlage = 0xA3 |
| 1\|2 | Length |
| 1 | DstAddr |
| 1 | SrcAddr |
| 1..N | Data |
| 4 | CRC |

FIG. 6 IHP MAC Frame

```
HTTP/1.1 200 OK
Content-Length: 35978
Content_Type: text/xml; charset="utf-8"
Date: Mon, 10 Feb 2008 11:26:26 GMT
Server: PowerTV DMS 1.0 UPnP/1.1 SA Explorer 8550
<s:Envelope
xmlns:s=http://schemas.xmlsoap.org/soap/envelope/
s:encodingStyle=http://schemas.xmlsoap.org/soap/encoding/>
    <s:Body>
        <u:ContentDirectoryServiceResponse xmlns:u="urn:schemas-upnp-
           org:service:serviceType:v">
            <Result>
            </Result>
        </u:ContentDirectoryServiceResponse>
    </s:Body>
</s:Envelope>
```

FIG. 10 carousel ID: 1345           // In Home IP address (8 bit) + port number
module ID:  0x0109          // CDS data type and flag indicate server type etc.
module version #: 1         // module version
carousel section #: 1       // current section number
carousel last section #: 1  // only 1 MPEG-PS section
                            // payload starts here
Status: 0x00                // status code extracted from HTTP response code 200
Time:   0x12345678          // 32 bit time stamp, extracted from the Date field Result: ...                 // Catalog content follows

FIG. 11

```
<DIDL-Lite xmlns:dc="http://purl.org/dc/elements/1.1/"
 xmlns:upnp="urn:schemas-upnp-org:metadata-1-0/upnp/"
 xmlns="urn:schemas-upnp-org:metadata-1-0/DIDL-Lite/">
    <item id="2" parentID="1" restricted="false">
        <dc:title>A Thousand Years</dc:title>
        <dc:creator>Sting</dc:creator>
        <upnp:class>
            object.item.audioItem.musicTrack
        </upnp:class>
        <res protocolInfo="http-get:*:audio/x-ms-wma:*">
            http://pc/getcontent?contentID="2"
        </res>
    </item>
    <item id="3" parentID="1">
        <dc:title>Desert Rose</dc:title>
        <dc:creator>Sting</dc:creator>
        <upnp:class>
            object.item.audioItem.musicTrack
        </upnp:class>
        <res protocolInfo="http-get:*:audio/x-ms-wma:*">
            http://pc/getcontent?contentID="3"
        </res>
    </item>
</DIDL-Lite>
```

FIG. 12

| Content ID | Attribute Name | Value |
|---|---|---|
| 2 | Title | A Thousand Years |
|  | Creator | Sting |
|  | Class | Music Video |
|  | File Format | WMA |
| 3 | Title | Desert Rose |
|  | Creator | Sting |
|  | Class | Music Video |
|  | File Format | wma |

FIG. 13

UPNP/DLNA COMPLIANT MR-DVR

FIELD OF THE INVENTION

Embodiments of the present invention relate to the field of multiple room digital video recorders (MR-DVR). More particularly, embodiments relate to the communication between a MR-DVR server device and a MR-DVR client using Digital Living Network Alliance (DLNA) and Universal Plug and Play (UPnP) (collectively known as UPnP/DLNA) protocol over a modulated signal.

BACKGROUND OF THE INVENTION

Broadband communications systems, such as cable television and satellite systems are now providing many services in addition to the traditional analog broadcast video. The set-top box (sometimes known as a set-top terminal or home communication terminal (HCT)), in implementing these enhanced services, has become an important computing device, accessing various video services. Besides supporting traditional analog broadcast of video, many set-top boxes (STB) now provide other services such as interactive program guide, picture-in-picture, viewing video on demand, subscription video-on-demand and services traditionally associated with a conventional computer, such as email. Recently, new functionality has been added to conventional STBs, namely the ability to record an incoming video stream in digitized form onto a mass storage device like a hard disk drive, and play back that recorded video as desired by the user. Some of these STBs, often referred to as digital video recorders (DVR) also allow the user to access and view a recorded program from a number of different televisions. This functionality is known as a "multi-room digital video recorder" (MR-DVR) and because of its ability to access digitally recorded programs from different locations, is generally viewed as a superior alternative to conventional video tape recorders for capture and subsequent playback of programming content.

Besides STBs most networked homes currently use a wide range of consumer electronics devices. Increasingly, these devices are providing similar or complimentary services to a MR-DVR system. For example, a consumer can now view a television show through a traditional television source such as a subscription with a cable or satellite provider. However, the same television show can also be downloaded through an internet website and stored on a computer for later viewing. Besides television shows, many applications that were once the domain of the computer can now be viewed on other displays which are often times associated with the MR-DVR system.

Given the array of storage and viewing options, it is desirable to have a system where a user can access programming stored in one of a plurality of devices such as a personal digital assistant (PDA), laptop or personal computer (PC) and view the program from one of a plurality of displays.

In the past, MR-DVR manufacturers used proprietary protocols to send programs between their MR-DVR server device and MR-DVR clients. This effectively created a wall between the MR-DVR system and other electronic equipment. Therefore, there is a need for a MR-DVR system that provides the connectivity necessary between a MR-DVR system and other consumer electronic devices such that programming stored in one system can be requested and viewed from the other.

SUMMARY OF THE INVENTION

In order to improve services, it is desirable to have a MR-DVR system that can communicate with other consumer electronic equipment. Embodiments described herein can be regarded as a MR-DVR system where the MR-DVR server device communicates with existing legacy MR-DVR clients using QAM/QPSK/FSK modulation as well as consumer electronic devices that have been certified as DLNA/UPnP compliant using multimedia over coax alliance (MOCA) modulated signals.

In one embodiment, a MR-DVR server device is connected through a Coaxial Cable Home Network (CCHN) to a plurality of legacy MR-DVR client devices and a plurality of other DLNA/UPnP compliant remote devices. The MR-DVR server device and legacy MR-DVR client communicate using a modulated signal with a frequency different from that used by the MR-DVR server device to communicate with DLNA/UPnP compliant remote devices. In addition, the MR-DVR server device receives programs from a STB parsing out the digital video from the other services offered in the broadband communication system. Alternatively, the functions of the MR-DVR server device can be incorporated into the STB instead of being two separate devices. In addition to the MR-DVR system connecting to DLNA/UPnP compliant remote devices through a CCHN, the MR-DVR server device can also connect to DLNA/UPnP compliant remote devices through other networks including but not limited to Ethernet or 802.11 networks.

Additional advantages will be set forth in part in the description which follows or may be learned by practice. The advantages will be realized and attained by means of the elements and combinations particularly pointed out in the appended claims. It is to be understood that both the foregoing general description and the following detailed description are examples and explanatory only and are not restrictive, as claimed.

BRIEF DESCRIPTION OF THE DRAWINGS

The accompanying drawings, not drawn to scale, which are incorporated in and constitute a part of this specification, illustrate embodiments and together with the description, serve to explain the principles of the methods and systems:

FIG. 6 illustrates an embodiment showing an in-home carousel format;

FIG. 10 illustrates an embodiment of a simple object access protocol response;

FIG. 11 illustrates an embodiment of a configuration of the in home carousel module;

FIG. 12 illustrates an embodiment of the DIDL-lite data format of the payload of the result field;

FIG. 13 illustrates an embodiment of a content directory table;

DETAILED DESCRIPTION

Figure 1A:
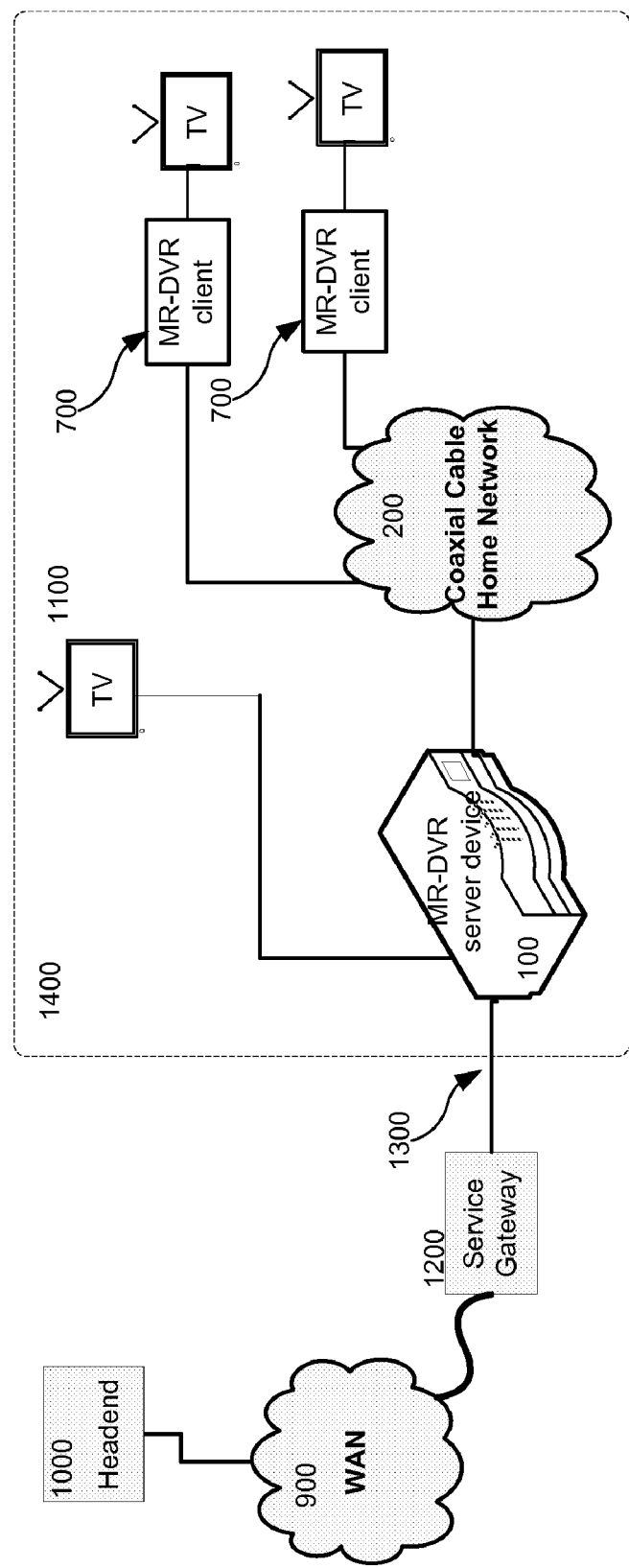
FIG. 1a illustrates an embodiment showing a MR-DVR system where the MR-DVR server device receives broadcast programs from the WAN through a STB and programs are viewed through requests from MR-DVR clients or through a display device directly connected to the MR-DVR server device.

Before the present methods and systems are disclosed and described, it is to be understood that the methods and systems are not limited to specific synthetic methods, specific components, or to particular compositions, as such may, of course, vary. It is also to be understood that the terminology used herein is for the purpose of describing particular embodiments only and is not intended to be limiting.

As used in the specification and the appended claims, the singular forms "a", "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

"Exemplary" means "an example of" and is not intended to convey a meaning of an ideal or preferred embodiment.

The present methods and systems may be understood more readily by reference to the following detailed description of preferred embodiments and the examples included therein and to the figures and their previous and following description.

Embodiments described herein can be understood in the context of a broadband communications system and a local network. Note, however, that the invention may be embodied in many different forms and should not be construed as limited to the embodiments set forth herein. Remote devices included in the broadband communications system receiving the transmitted broadband signals may include a remote settop terminal, a television, a television including a point of deployment (POD) module, a consumer electronics device such as a DVD player/recorder, a computer, a personal digital assistant (PDA), or other devices. All examples given herein, are intended to be non-limiting and are provided in order to help clarify the description of the invention.

Embodiments described herein are for a networked multimedia system (NMS) suitable for use in a CCHN. While the NMS will typically be located within a subscriber premise, they may also be located in schools, hotels, hospitals, businesses, as long as the premise is locally networked.

In accordance with described embodiments, a primary or settop MR-DVR typically receives (from the headend) and forwards (to client devices) multiple digital video programs. Upon user request, the MR-DVR server device can record and store specific programs for later viewing. Legacy MR-DVR client devices can make requests to the MR-DVR server device to record specific programs or can request to view previously recorded programs or live broadcast programs. Giving legacy MR-DVR clients access to programming stored on the MR-DVR server device allows the user to view the stored program on a plurality of displays in different locations without the necessity of having expensive duplicate storage devices for each MR-DVR client. In addition to viewing the stored programs, the legacy MR-DVR clients may directly receive broadcast programming (i.e. programming traditionally associated with analog cable television, video on demand, etc.) as well as perform administrative functions (i.e. interactive guide, allocate memory space, record/delete programs, etc.).

In addition to legacy MR-DVR clients, the MR-DVR server device can also support other client devices which are DLNA/UPnP compliant. A DLNA/UPnP compliant remote device may perform the same functions as the MR-DVR clients in addition to any other functions specific to that DLNA compliant device.

In other words, the MR-DVR client devices may be simplified, less-costly versions of the MR-DVR server device but are capable of utilizing, via the CCHN, some or all of the advanced hardware and software features, such as memory, a mass storage device, or software applications, that are available in the MR-DVR server device. A communications system that is suitable in implementing an embodiment is described herein below.

FIG. 1a is a simplified block diagram depicting a non-limiting example of a conventional broadband communications system. In this example, the communication system includes a headend 1000 that is coupled to a service gateway 1200 via a wide area network (WAN) 900. The WAN 900 may be any network that is suitable for transmitting downstream and upstream broadband multimedia signals, such as audio/video signal, IP signals, telephony signals, or data signals to name but a few. The WAN 900 may be, for example, a hybrid fiber/coax (HFC) network, a fiber-to-the-home (FTTH) network, a satellite network, or a fixed wireless network, among others.

The service gateway 1200 provides a local connection 1300 to a MR-DVR server device 100, which then provides the signals to remote legacy MR-DVR client devices 700 as well as television programming to an optional television 1100 directly connected to the MR-DVR server device 100. The MR-DVR server device 100, legacy MR-DVR clients 700, and television 1100 comprise the MR-DVR system 1400. Besides the MR-DVR server device 100, the service gateway 1200 can couple to other remote devices directly or via one or more other local network. It will be appreciated that the service gateway 1200 may be a stand-alone unit or may be integrated into another device, such as, for example, a television or a computer or the MR-DVR server device 100. Additionally the remote devices including the legacy MR-DVR clients 700 may be located in different rooms from where the service gateway 1200 or the MR-DVR server device 100 is located.

The headend 1000 includes one or more server devices (not shown) for providing video, audio, and/or data signals to the service gateway 1200 via the WAN 900. The headend 1000 and the service gateway 1200 cooperate to provide a user with a variety of services via remote devices such video/audio programming through the MR-DVR server device 100. Other services include telephony service and IP services, among others. Video/audio programming provided to the MR-DVR server device 100 may include, for example, analog or digital television channels and interactive services, video-on-demand (VOD) services, and/or pay-per-view (PPV) services, among others.

In FIG. 1a, a user watches broadcast television channel programming through any one of the MR-DVR client devices 700 connected to a television or through a television 1100 directly connected to the MR-DVR server device 100. Through a user interface on the MR-DVR server device 100 or any one of the MR-DVR client devices 700, a user can request television programming to be recorded and saved to a storage device in the MR-DVR server device 100. The recorded program can be from a specific television channel at a specific time or can be through VOD or PPV services. From a MR-DVR client 700 or from the MR-DVR server device 100, a user can request to view previously saved programming on the MR-DVR server device 100 or delete programming from the MR-DVR server device 100 if so desired. Requests to store, view or delete programming can be accomplished through a CCHN 200 which connects the MR-DVR server device 100 and the MR-DVR clients 700. Note, viewing, storing and deleting programming from the MR-DVR server device 100 are examples of some types of interaction available between devices in the MR-DVR system 1400 and should not be construed as limiting the invention to only the interactions described.

Figure 1B:
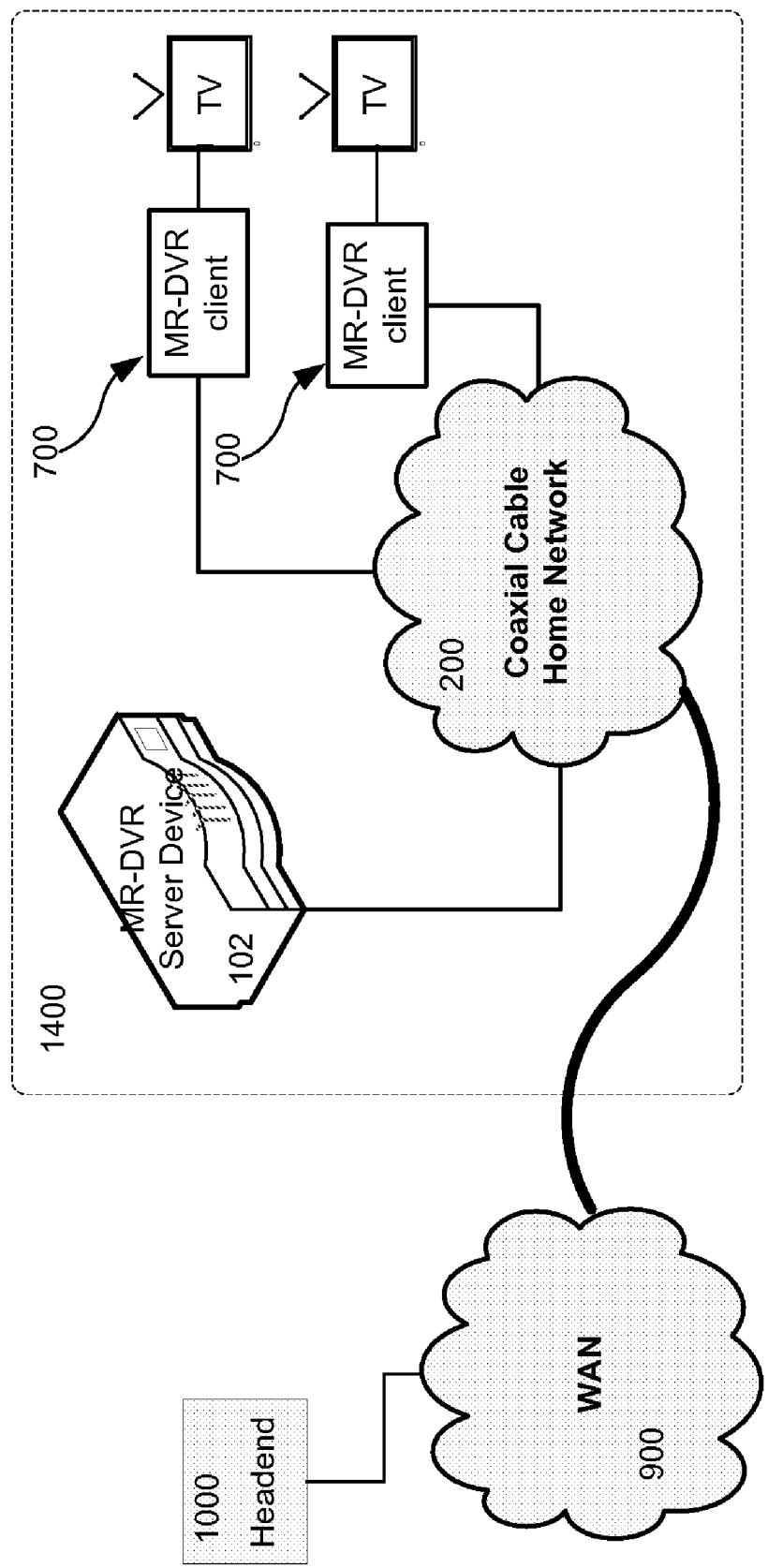
FIG. 1b illustrates an embodiment showing a MR-DVR system where the MR-DVR server device directly connects to the headend through a WAN and programs are viewed through requests from MR-DVR clients.

FIG. 1b depicts another non-limiting example of a conventional broadband communication system. However, in this example, the functionality of the service gateway 1200 is incorporated into the MR-DVR server device 102 and the optional television 1100 is not connected. In another embodiment of the conventional broadband communication system, the MR-DVR server device is equipped with a built in tuner and the gateway functionality is not needed.

Figure 2A:
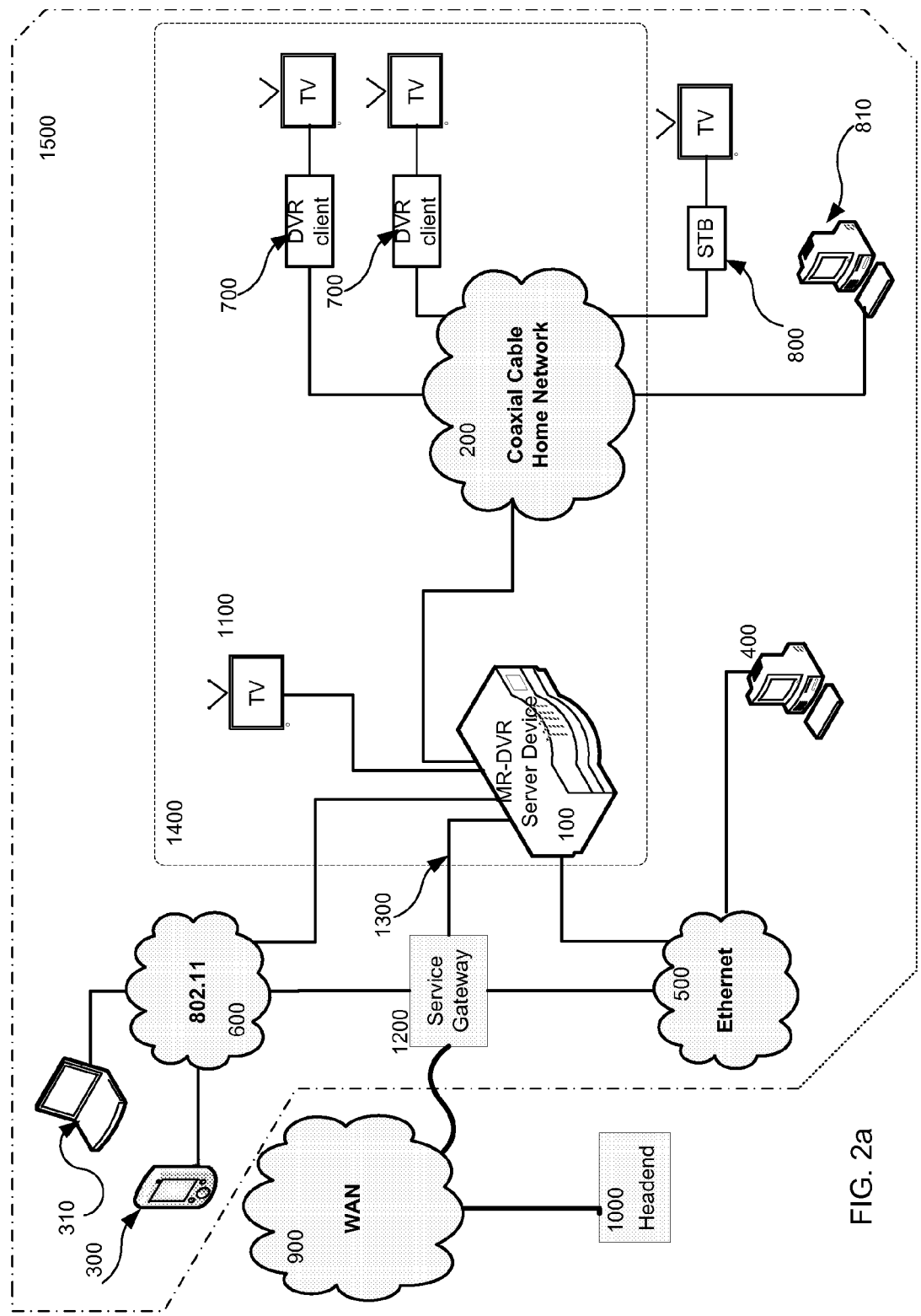
FIG. 2a illustrates the exemplary system of FIG. 1a in combination with UPnP/DLNA compliant remote devices connected to the MR-DVR server device through various networking mediums.

FIG. 2a depicts a non-limiting example of a conventional broadband communication system. In addition to the functions described in FIG. 1a, this system also illustrates connectivity between the MR-DVR system 1400 and other DLNA/UPnP compliant remote devices 300, 310, 400, 800, 810. In this embodiment, the service gateway 1200 provides video/audio broadcast programming through local network 1300 to the MR-DVR server device 100 as well as IP service through Ethernet 500 and wireless 600 networks. In addition to the functionality described in FIG. 1a, in this system, a MR-DVR client 700 can also interact with any one of the plurality of DLNA/UPnP compliant remote devices 300, 310, 400, 800, 810.

One non-limiting example of a possible interaction would include a legacy MR-DVR client 700 request for programming stored on any one of the plurality of DLNA/UPnP compliant remote devices. A viewer using a legacy MR-DVR client 700 requests through the MR-DVR server device 100, programming stored on a laptop 310. The MR-DVR server device 100 sends the request through the wireless network 600, receives the programming from the laptop 310 and sends the programming to the requesting legacy MR-DVR client 700 over the CCHN 200. In another example, a viewer using a legacy MR-DVR client 700 can request through the MR-DVR server device 100, programming stored on PC 810. In this instance, the MR-DVR server device 100 sends the request to the PC 810 through the CCHN 200 using a frequency different than that used within the legacy MR-DVR system 1400. The MR-DVR server device 100 receives the programming from the PC 810 on this different frequency, and sends the program to the requesting legacy MR-DVR client 700 using the frequency recognized by the legacy MR-DVR system 1400.

In one embodiment, the legacy MR-DVR client 700 communicates with the MR-DVR server device 100 using the MR-DVR protocols that are extended with capability of remote recording and with optionally the UPnP Media Server Control Protocol. The MR-DVR server device 100 passes the network information, e.g., home network topology and the discovered UPnP devices 300, 310, 400 and services, to the legacy MR-DVR client 700 such that the user may interact with the information.

The MR-DVR server device 100 provides a standalone or aggregated content directory service to the legacy MR-DVR client 700, allowing the user of the legacy MR-DVR client 700 to navigate the content items that are available on a particular media server including the MR-DVR server 100 or all content items in, but not limited to, the home network 1500. The content items may contain, but is not limited to, content items that have been stored on any home network 1500 device 100, 300, 310, 400, 810, and broadcast programs listed in an Electronic Program Guide (EPG).

In an embodiment, when the legacy MR-DVR client 700 selects a content item that has been authorized, the MR-DVR server device 100 delivers the requested media content in MPEG transport to the legacy MR-DVR client 700, regardless of the location of the media content. While setting up the content delivery session, the MR-DVR server device 100 allocates for the legacy MR-DVR client 700 resources including network resources, e.g., network QoS, and device resources, e.g., a local DVR playback session.

In an embodiment, the MR-DVR server provides a standalone or aggregated Scheduled Recording Service (SRS) to the legacy MR-DVR client 700. This service allows the user of the legacy MR-DVR client 700 to schedule a recording on the MR-DVR server device 100 or any UPnP Media Server that is connected to, but not limited to, the network in a subscriber's premises.

In an embodiment, if the media content is located on an UPnP media server other than the MR-DVR server device 100, the MR-DVR server device 100 translates MR-DVR requests from the legacy MR-DVR client 700 to UPnP requests, sending the UPnP requests to the UPnP media server. Additionally, the MR-DVR server device 100, translates UPnP responses from the UPnP Media Server, sending the response to the legacy MR-DVR client 700. The MR-DVR server device receives the media content in, but not limited to, HTTP or RTP protocol from the UPnP media server, retransmitting to the legacy MR-DVR client 700 the media content in the legacy MR-DVR transport protocol.

When the content compression format is not compatible with the legacy MR-DVR client 700 format, the MR-DVR server device 100 transcode the format to the legacy MR-DVR client 700 format. For a non limiting example, IEEE standard H.264 is transcoded by the MR-DVR server device 100 to MPEG2.

In FIG. 2a, the DLNA/UPnP compliant remote devices 300, 310, 400, 800, 810, can also access programming stored on the MR-DVR server device 100. For example, STB 800 can request programming stored in the MR-DVR server device 100 though the CCHN 200 using a frequency not recognized by the legacy MR-DVR system 1400. The MR-DVR server device 100 would respond by sending the appropriate programming to STB 800 using a frequency not recognized by the legacy MR-DVR system 1400. Note, DLNA/UPnP compliant remote devices requesting programming from the MR-DVR server device 100 is one non-limiting example of the type of interaction capable between the MR-DVR system and DLNA/UPnP compliant remote devices. Other possible interaction includes but is not limited to requesting MR-DVR server device 100 to store programming to a memory storage device, deleting programming, and various network maintenance interactions.

Figure 2B:
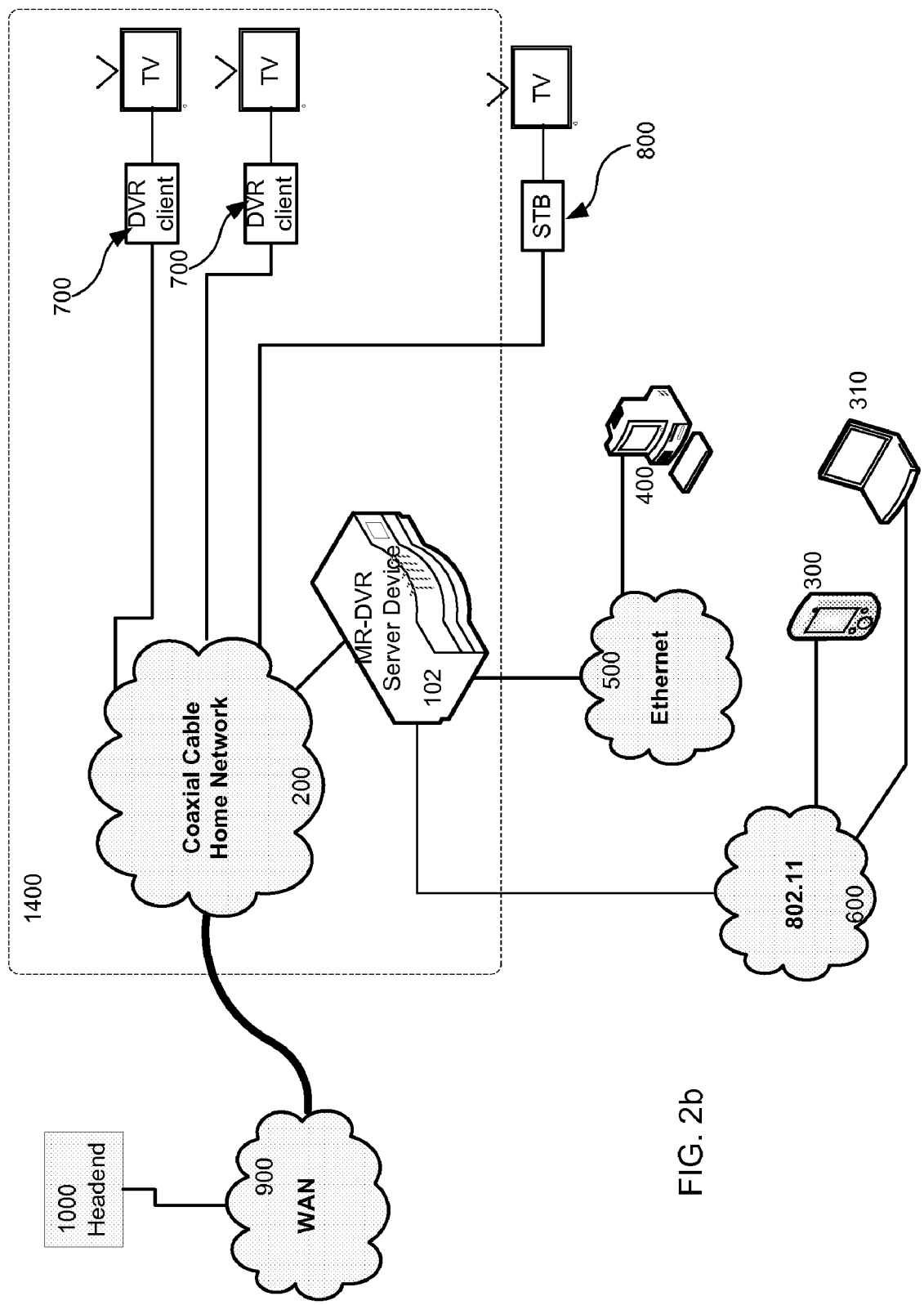
FIG. 2b illustrates the exemplary system of FIG. 1b in combination with UPnP/DLNA compliant remote devices connected to the MR-DVR server device through various networking mediums.

FIG. 2b depicts another non-limiting example of a conventional broadband communication system similar to the one in FIG. 2a. However, in this example, the MR-DVR server device 102 and legacy MR-DVR clients 700 have built in tuners, removing the need for gateway functionality and the optional television 1100 is not connected. In another embodiment the functionality of service gateway 1200 may be incorporated into the MR-DVR server device 102.

Figure 3A:
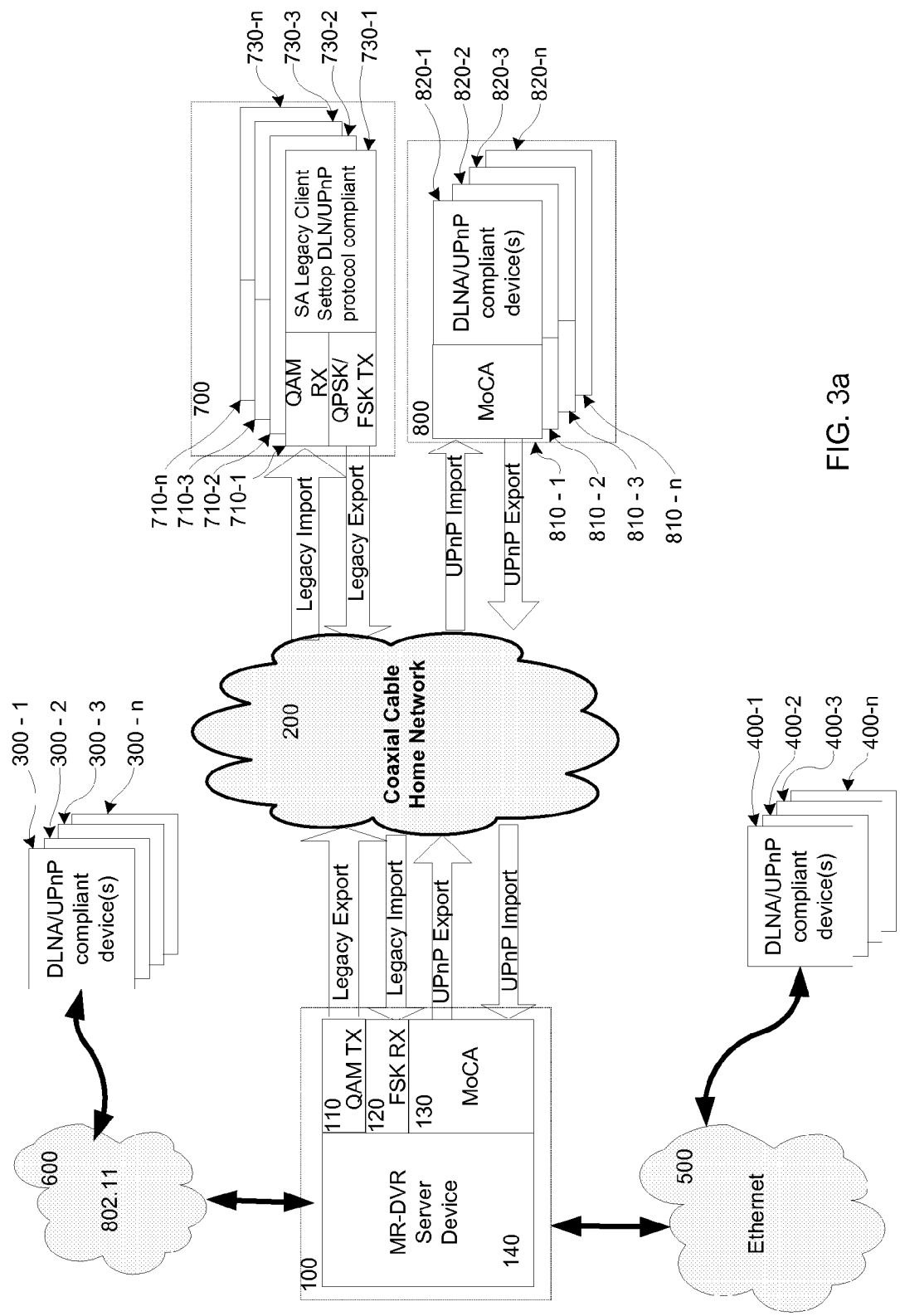
FIG. 3a illustrates an embodiment showing encoding/decoding modules for communication between the MR-DVR server device, legacy MR-DVR client devices, and UPnP/DLNA compliant remote devices.
Figure 3B:
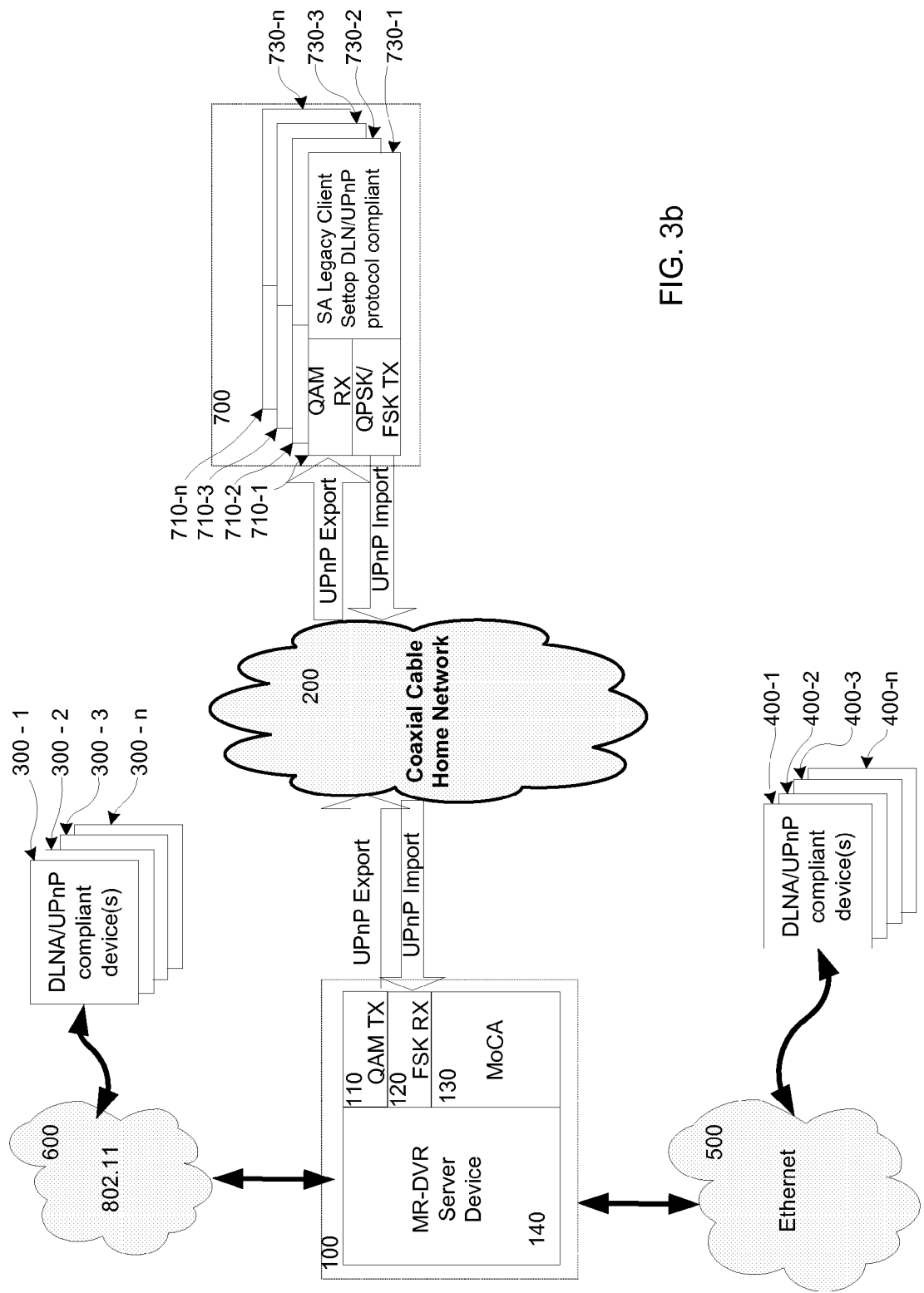
FIG. 3b illustrates an embodiment showing encoding/decoding modules for communication between the MR-DVR server device, legacy MR-DVR clients using UPnP protocol.

FIG. 3a is a simplified, non-limiting block diagram illustrating selected communication components of the MR-DVR server device 140, MR-DVR client 700 and DLNA/UPnP compliant remote devices 800. Communication between the MR-DVR server device 100, legacy MR-DVR clients 700 and DLNA/UPnP compliant remote devices 800 is over the same CCHN 200. Communication associated with legacy MR-DVR clients 700 use QAM/QPSK/FSK modulated signals. Communication associated with DLNA/UPnP compliant remote devices 800 use modulated signals including but not limited to MoCA modulation and ultra wide bandwidth (UWB) modulation over coaxial cable. Because the modulation frequencies are different for legacy MR-DVR clients 700 and DLNA/UPnP compliant remote devices 800, there is generally no interference in communication between the devices with the MR-DVR server device 100. In addition, the MR-DVR server device 140 interacts with other DLNA/UPnP compliant remote devices 300, 400 through other local networks 500, 600. Generally, legacy protocols may be used for communication between the MR-DVR server device 100 and legacy MR-DVR clients 700. However, as shown in FIG. 3b, some communication between the MR-DVR server device 100 and legacy MR-DVR clients 700 may be based on UPnP protocols.

In addition to UPnP export and import used for communication between the MR-DVR server device 100 and the MR-DVR legacy clients 700, some legacy communication between the MR-DVR server device 100 and the MR-DVR legacy client may continue to rely on legacy import/export protocol. FIG. 3b illustrates this communication pathway. Using QAM/QPSK/FSK modulations, communications that need not be converted to UPnP format will continue using the legacy communication structure.

Figure 4:
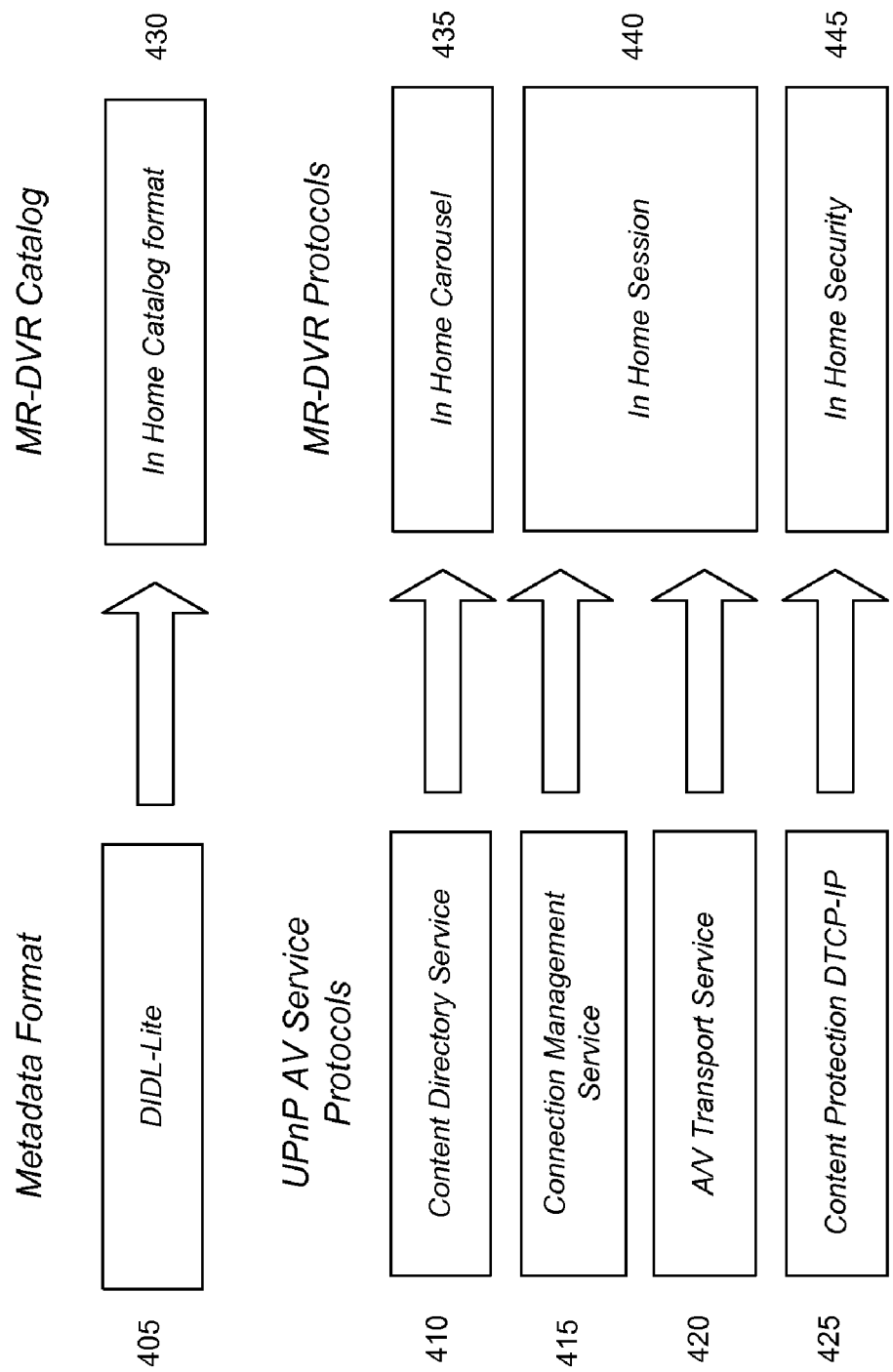
FIG. 4 illustrates an embodiment showing exemplary translations to convert between DLNA/UPnP protocol to protocol used by legacy MR-DVR client devices in providing MR-DVR related services.

FIG. 4 is a simplified, non-limiting illustration of exemplary translations transforming DLNA/UPnP compliant communications to legacy protocols recognized by the legacy MR-DVR clients. In the UPnP AV Service Protocol, the content directory service (CDS) 410 provides a content list to a client based on the client's request and is based on simple object access protocol (SOAP) and digital item description language lite (DIDL-lite) formats. The requested content directory is delivered to the client via SOAP as an extensible markup language (XML) fragment. For delivery to the MR-DVR legacy client device, the MR-DVR server transforms this data into an "in home carousel" 435 data format illustrated in FIG. 6, prior to sending it to the MR-DVR legacy client device. The in home carousel concept is similar to the digital storage media command and control (DSM-CC) carousel where the data is broadcast repeatedly over the network. Note, a carousel module may span over several MPEG-PS sections with the section number and last section number values in the carousel used by the MR-DVR legacy client device to ensure the integrity of the received data. The in home catalog 430 along with the in home carousel (IHC) 435 provides catalog delivery service and parsing functions to the legacy MR-DVR clients. Auxiliary protocols, connection management service 415 and A/V transport service 420, used for the establishment of an AV session are translated to an in home session protocol 440 used by the legacy MR-DVR clients. In addition, the MR-DVR server translates the data in DIDL-lite format 405 to an IHC format 430 used by the MR-DVR legacy clients. The in home catalog format 405 may be a fixed data format or an XML file.

Upon receiving a playback request from a legacy MR-DVR client device, the MR-DVR server creates an AV session by allocating end-to-end AV resources. This AV session combines an in home session over the MR-DVR network and an AV session over the remaining home network. For a MR-DVR network, the server allocate resources via an in home session protocol. For network segments other than MR-DVR segments, the MR-DVR server device 100 allocates resources via appropriate protocol, for non-limiting examples, RTSP or session initiation protocol (SIP) for RTP streaming. The end-to-end resource may include, but is not limited to, security resource, network QoS and network connectivity resource such as a tuner or an IP socket.

Figures 5A, 5B:
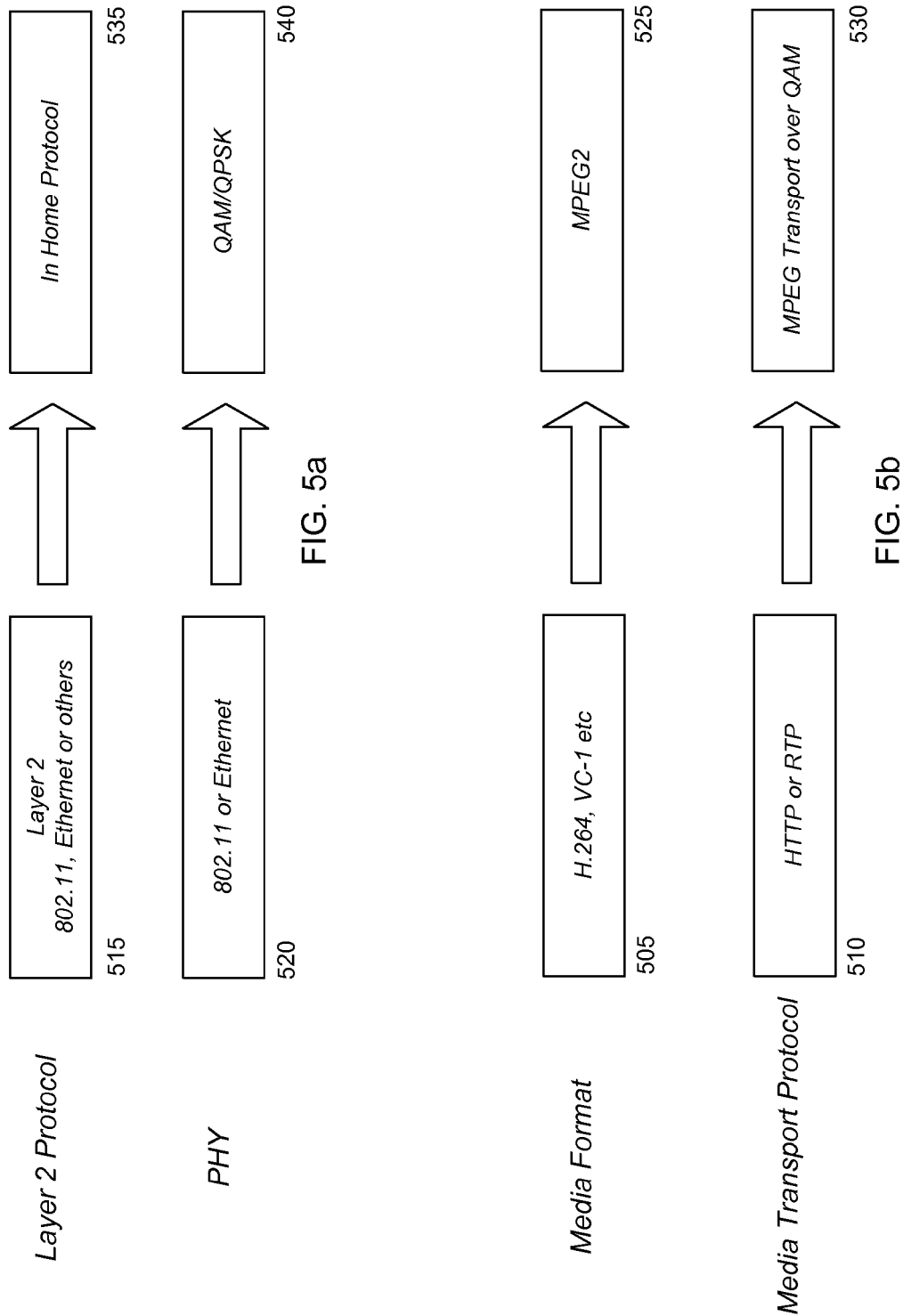
FIG. 5a illustrates an embodiment showing the type of translations in communicating between legacy MR-DVR client devices and DLNA/UPnP devices.
FIG. 5b illustrates an embodiment showing translations in media transport and media format.

FIG. 5a is a simplified, non-limiting embodiment illustrating the translations in communicating between legacy MR-DVR clients and DLNA/UPnP compliant devices. Layer 2 protocol 515, which may include but is not limited to 802.11 or Ethernet is transformed to an in home protocol 535 using QAM/QPSK/FSK. The physical layer 520 which may include but is not limited to 802.11 or Ethernet is transformed to a QAM/QPSK/FSK modulated layer 540.

FIG. 5b is a simplified, non-limiting embodiment describing different networking layers and the translations the MR-DVR server device performs. At the top most layer, the legacy MR-DVR clients are configured to recognize MPEG2 video formats 525. The MR-DVR server device translates other video formats such as H.264 and VC-1 505 to MPEG2. The MR-DVR server device also translates from HTTP or RTP format 510 used by other DLNA/UPnP compliant devices to MPEG transport over QAM 530 for legacy MR-DVR clients.

In an embodiment, the legacy MR-DVR client uses an in home address assignment algorithm. When the algorithm limits the in home IP/MAC addresses to the legacy MR-DVR network, the MR-DVR server device 100 routes the data to and from the legacy MR-DVR network. FIG. 6 illustrates one embodiment of a possible in home IP MAC frame. The MR-DVR server device builds a network address table (NAT) to map a local port number to the in home IP address and the port number of the legacy MR-DVR client. Using the table, the MR-DVR server device routes command control messages between the media server and the legacy MR-DVR client.

Additionally, the MR-DVR server device builds and maintains a table to map HTTP or RTP transport sessions to the MPEG program numbers used by the plurality of legacy MR-DVR clients.

Figure 7:
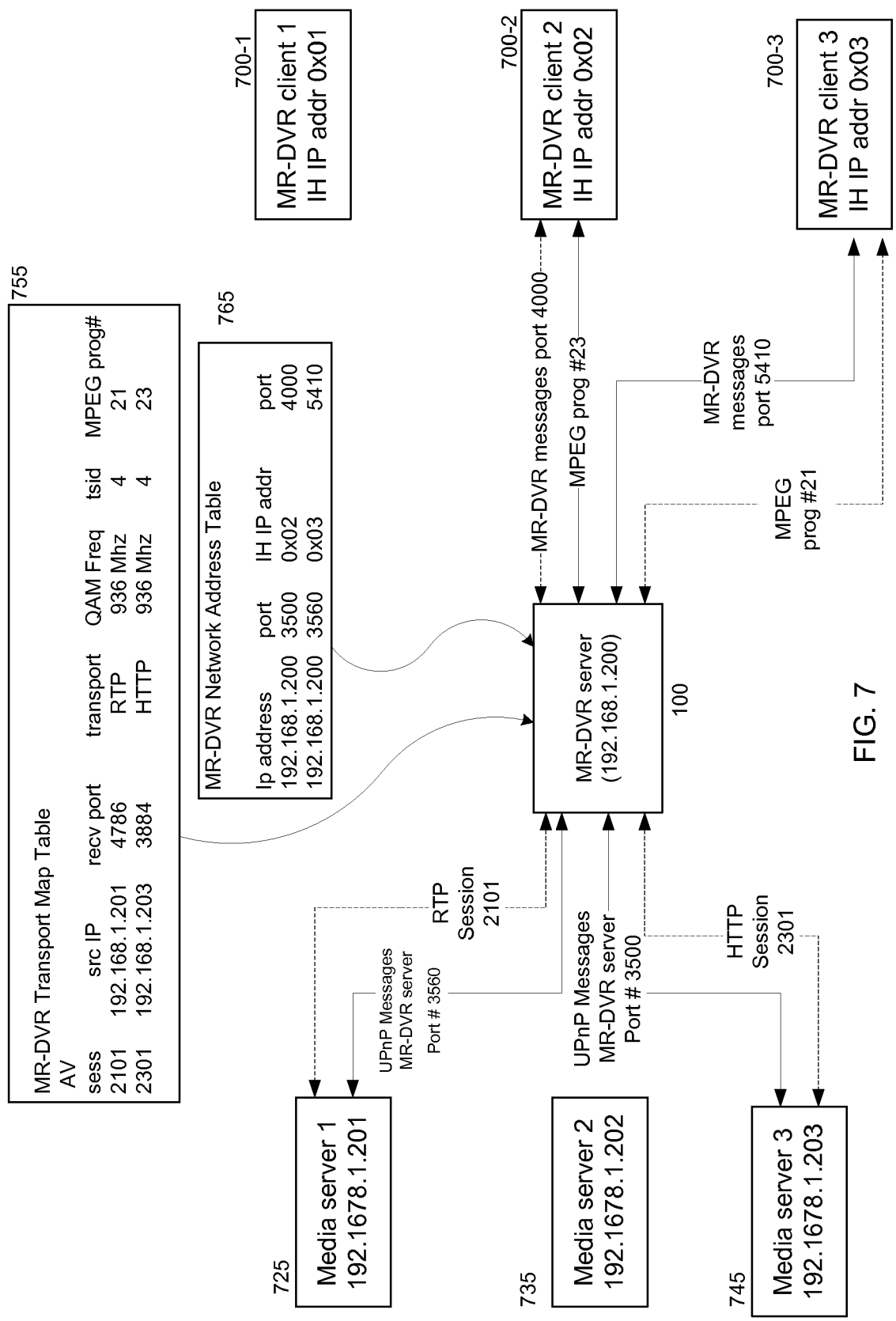
FIG. 7 illustrates an embodiment of an MR-DVR server device maintaining a NAT and a transport map table for multiple transport sessions.

FIG. 7 illustrates an example of an MR-DVR server device 100 maintaining a NAT 765 and a transport map table 755. In this illustration, one remote media server 725, using RTP transport, and a legacy MR-DVR client 700-3 have established a transport session. Additionally, one remote media server 745, using HTTP transport, and a legacy MR-DVR client 700-2 have established a second transport session. The MR-DVR creates and maintains a transport map table 765 associating transport information for the two transport sessions. As new transport sessions are established or current sessions terminated the MR-DVR server device 100 updates the transport map table 755. The MR-DVR server device 100 also creates and maintains the NAT 765. When routing command control messages between a media server 725, 745 and a legacy MR-DVR client 700-3, 700-2, the MR-DVR server device 100 refers to this table. As new transport sessions are established or current sessions terminated, the MR-DVR server device 100 updates the NAT 765. Note, FIG. 7 is a non limiting illustration of one possible configuration of transport sessions. In other possible non limiting configurations, the number of media servers and legacy MR-DVR clients operably connected to the MR-DVR server device 100 may be greater than or less than that shown in FIG. 7. Additionally, legacy MR-DVR clients 700 are not restricted to establishing transport sessions with media servers as shown in FIG. 7 and may establish transport sessions with any one of the plurality of media servers operably connected to the MR-DVR server device 100.

In an embodiment, the MR-DVR server device translates between UPnP content directory service (CDS) messages and legacy MR-DVR messages. CDS on a media server provides a list of content items (content directory) to a client based on the client's request. UPnP AV device architecture defines CDS for this purpose. The service is based on SOAP and digital item description language lite (DIDL-Lite) format. The requested content directory is delivered via SOAP as an extensive markup language (XML) fragment. For example, the UPnP CDS action to acquire a content directory is CDS:Browse( ). A UPnP control point sends a SOAP message with CDS:Browse( ) tag and parameters. Upon receiving this request, UPnP media server fulfills the request and returns the result in XML format encapsulated in the SOAP response message.

In an embodiment, the legacy MR-DVR client receives the content directory (a.k.a content catalog) via the in home carousel protocol. The in home carousel concept is similar to the digital storage media command and control (DSM-CC) carousel where the data is broadcast repeatedly over the network. The data carousel may carry various types of data that are not limited to the catalog data. The legacy MR-DVR client filters the carousel data based on carousel ID and module ID and assembles the data back to its original form.

Figure 8:
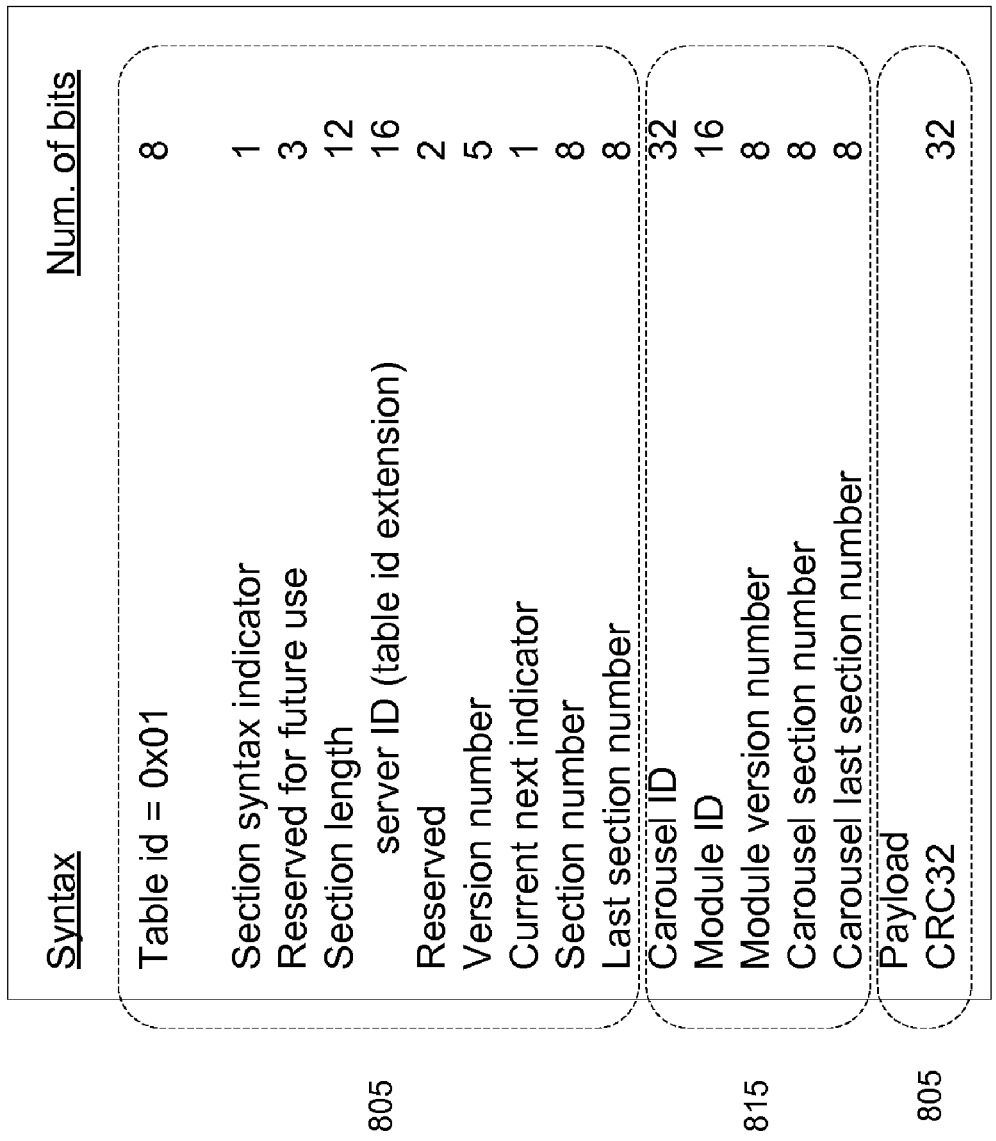
FIG. 8 illustrates an embodiment of an in home carousel data format.

An example of one possible format for an in home carousel data format is illustrated in FIG. 8. The header contains two portions, a standard MPEG private session (MPEG-PS) header 805 and an in home carousel header 815. The carousel ID identifies the receiving client and the associated data attributes such as transaction number whereas the module ID may indicate the data type (such as Catalog or user data). Note that when the size of a MPEG section is limited to 4096 bytes. Therefore a carousel module may span over several MPEG-PS sections. The carousel section number and the last section number are used by the client to ensure the integrity of the received data.

Figure 9:
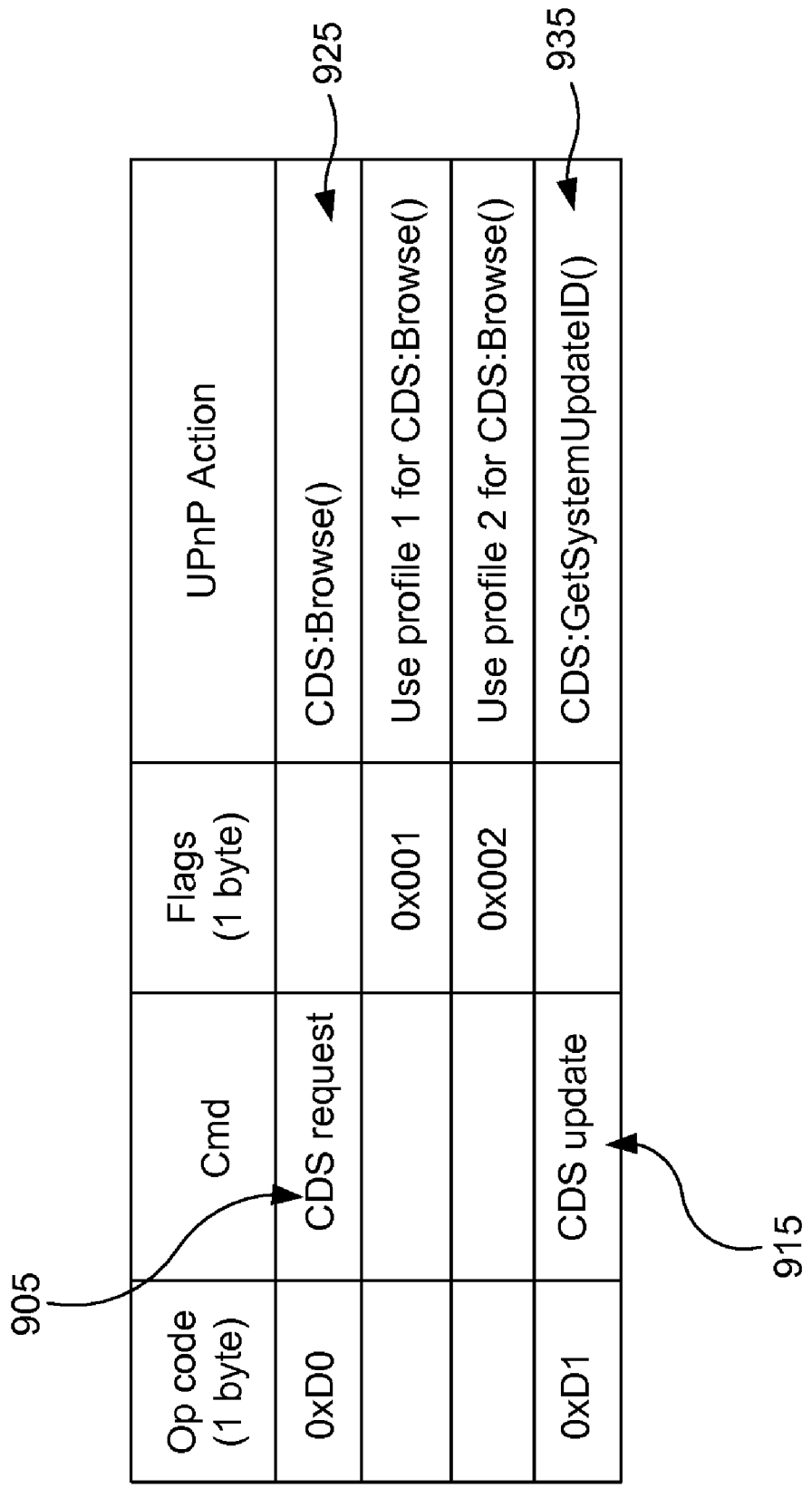
FIG. 9 illustrates an embodiment of MR-DVR messages mapping to UPnP CDS actions.

In an embodiment, the legacy MR-DVR protocol uses a one byte Op Code to identify the request and the parameter data is limited to a few bytes depending on the return path bandwidth. Therefore the content directory requests mapping to the UPnP CDS requests will be based on pre-defined browse profiles. For example, a profile may request all MPEG 2 content items on the MR-DVR server only whereas another profile request all MPEG2 content items available on all Media Servers. FIG. 9 illustrates a simplified non-limiting example of some MR-DVR messages mapping to UPnP CDS actions. In FIG. 9 a command for CDS request 905 is mapped to a CDS:browse( ) 925 UPnP action. A command for CDS updated 915 is mapped to a CDS:GetSystemUpdate( ) 935 UPnP action. Note, this example illustrates several commands and actions in a plurality of possible commands and actions and is not to be understood as limiting the invention to the commands and actions described in FIG. 9.

In an embodiment, the translation for content directory query results is done over two layers, the transport layer and the application layer. The MR-DVR server device converts SOAP packets to MPEG-PS with in home carousel payloads and also translates data in DIDL-lite format to a data format used by the legacy MR-DVR client. SOAP, used by UPnP as the command transport protocol, is built on top of HTTP. FIG. 10 illustrates an example of one possible SOAP response. In this example, the SOAP response is the payload contained in a TCP packet responding to a CDS request. Upon receiving the response from a DLNA DMS, the MR-DVR server extracts the payload (result tag), constructs an in home carousel module by inserting the content encapsulated in the result tag of the SOAP envelope and portions of the HTTP header information into the payload field of FIG. 7. One possible configuration of the in home carousel module is illustrated in FIG. 11. Note, this example illustrates one possible response in a plurality of responses and is not to be understood as limiting the invention to the response described in FIG. 10 and FIG. 11.

In an embodiment, the payload of the result field contains data in DIDL-lite format as illustrated in FIG. 12. When the legacy MR-DVR client does not support DIDL-lite format, the MR-DVR server device converts this data into a table illustrated by FIG. 13. The catalog data format may be a fixed data format or a XML file. Note, this non limiting example illustrates the conversion process between DIDL-lite format and a catalog data format and should not be understood as limiting the invention to the conversions described in FIG. 12 and FIG. 13.

Figure 14:
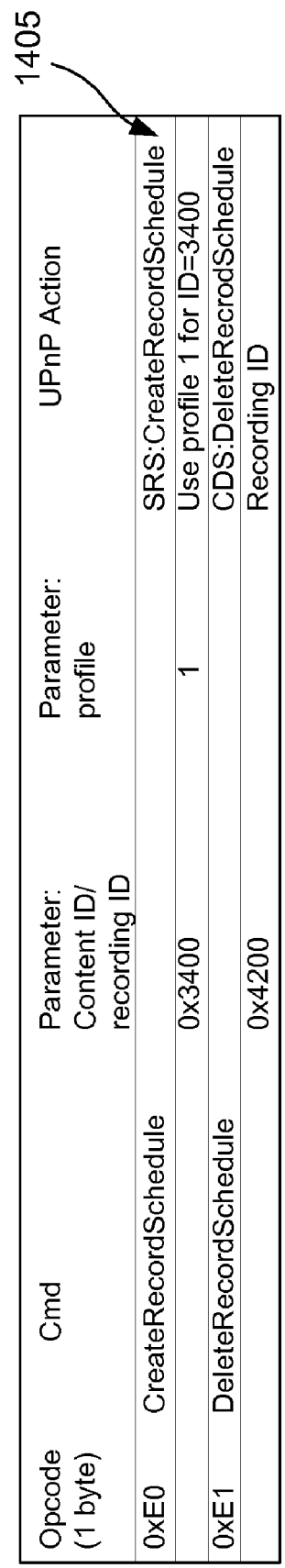
FIG. 14 illustrates an embodiment of the mapping of UPnP SRS actions to MR-DVR requests.

In an embodiment, UPnP Scheduled recording service (SRS) is used to manage a recording schedule. The MR-DVR server device requests mapping of UPnP SRS actions is based on pre-defined profiles/templates. FIG. 14 illustrates a possible mapping format. The output parameters of SRS:CreateRecordSchedule( ) 1405 includes RecordScheduleID, RecordSchedule and UpdateID. The MR-DVR server creates a unique 16-bit ID to map the return parameters, store them and send the 16-bit ID to the legacy MR-DVR client as a token for future reference.

In an embodiment, upon receiving a playback request from a legacy MR-DVR client, the MR-DVR server device creates an AV session by allocating end-to-end AV resources. This AV session combines an in home session over the MR-DVR network and an AV session over the remaining home network. The legacy MR-DVR client requests for an in home session setup with the MR-DVR server device using the in home session protocol. In addition, the MR-DVR server sets up the other AV session between the MR-DVR server and the target UPnP Media Server. The MR-DVR server associates the end-to-end AV resources relevant to the transport protocol with the AV session. For example, if the UPnP Media Server supports RTP transport, the MR-DVR server associates the RTSP session with the AV session.

In an embodiment, the legacy MR-DVR client requests end-to-end network resource allocation, i.e., to set up end-to-end quality of service (QoS), for content streaming. Two models of home networking QoS supported by UPnP QoS service are prioritized QoS and parameterized QoS. The MR-DVR server device performs the QoS admission control over the MR-DVR network segment by comparing the accumulated program bandwidths against the QAM bandwidth. For other segments, the MR-DVR server may set up parameterized or prioritized QoS via UPnP. When the stream request is admitted to the MR-DVR network, the MR-DVR server device follows the UPnP QoS process to set up the QoS for other network segments.

Figure 15:
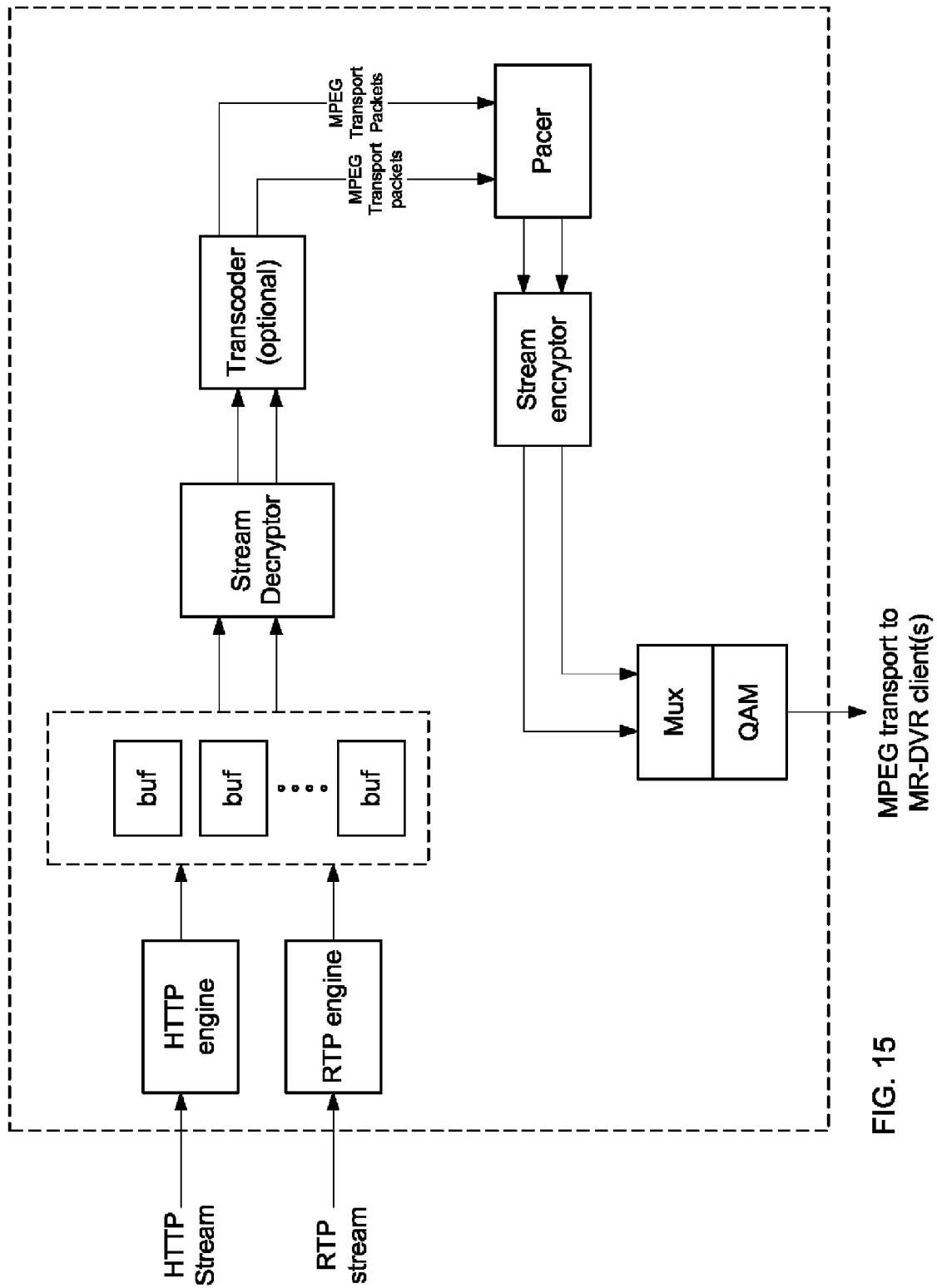
FIG. 15 illustrates an embodiment of the logic blocks for converting HTTP or RTP transport to MPEG transport over the MR-DVR network

In an embodiment, the MR-DVR server device uses HTTP or RTP to acquire the content for the legacy MR-DVR client. FIG. 15 illustrates the logic blocks to convert HTTP or RTP transport to MPEG transport over the MR-DVR network. The HTTP or RTP stream is converted to the MPEG2 transport stream. A transcoder is used if the media format is not in MPEG2 transport format, e.g., H.264. The stream decryptor and encryptor converts the encryption format to one that can be decrypted by the legacy MR-DVR client, for example DTCP-IP to 3-DES. The stream decryptor and encryptor are logical entities and in an embodiment may be located in a separable security module that is plugged into the MR-DVR server device.

In an embodiment, converting RTP or HTTP transport to legacy MR-DVR media transport includes trick mode capability including but not limited to, pause, resume playback from the paused point, jump to live programming, jump to specified position in a program, fast forward with multiple speeds, fast rewind with multiple speeds, slow forward and slow rewind.

In an embodiment, the network topology information can be collected by MR-DVR via the UPnP protocol or other proprietary protocol. The information can be delivered to the legacy MR-DVR clients. The user can view the presentation of network information and may graphically select a Media Server to view the content directory or schedule a recording on this server.

The system described above is but one non-limiting embodiment. The embodiment described above included wireless and Ethernet connectivity. In another embodiment, the wireless and/or Ethernet connectivity would not be provided. In yet another embodiment, direct connectivity from the MR-DVR server device to a television would not be provided.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as examples only, with a true scope and spirit being indicated by the following claims.

What is claimed is:

1. A method for communicating UPnP information comprising:
   receiving, by a MR-DVR client, QAM modulated signals encoded with first UPnP information and a pre-defined profile, wherein the pre-defined profile comprises a unique ID having mapping return parameters for use by the MR-DVD client;
   transmitting, by the MR-DVR client, a QPSK modulated signal encoded with second UPnP information; and
   requesting mapping of UPnP SRS actions based on the pre-defined profile.

2. The method of claim 1, wherein receiving, by the MR-DVR client, the QAM modulated signals encoded with the first UPnP information comprises receiving the first UPnP information from a MR-DVR server device over a network.

3. The method of claim 2, wherein the network comprises a coaxial cable network system.

4. The method of claim 2, wherein receiving the first UPnP information from a MR-DVR server device over the network comprises receiving the first UPnP information from the MR-DVR server device located within a home network.

5. The method of claim 4, wherein the home network comprises a plurality of network media located at a customer's premises.

6. The method of claim 2, wherein receiving, by the MR-DVR client, the first UPnP information from the MR-DVR server device over the network comprises receiving the first UPnP information by the MR-DVR client located at a customer's premises.

7. A method for communicating UPnP information comprising:
   transmitting, by a MR-DVR server device, QAM modulated signals encoded with first UPnP information and a pre-defined profile, wherein the pre-defined profile comprises a unique ID having mapping return parameters for use by a MR-DVD client;
   receiving, by the MR-DVR server device, a QPSK modulated signal encoded with second UPnP information;
   transmitting data, by the MR-DVR server device, to a network device;
   receiving data, by the MR-DVR server device, from the network device;
   routing, by the MR-DVR server device, data traffic between the network device and a MR-DVR legacy network; and
   requesting mapping of UPnP SRS actions based on the pre-defined profile.

8. The method of claim 7, wherein routing the data traffic between the network device and the MR-DVR legacy network comprises:

translating, by the MR-DVR server device, between a UPnP content directory service message and a legacy MR-DVR message;

translating, by the MR-DVR server device, between a UPnP scheduled recording service message and the legacy MR-DVR message;

setting up, by the MR-DVR server device, an audio/video (AV) streaming session over a network segment wherein the network device is operably connected to the network segment;

setting up, by the MR-DVR server device, the AV streaming session over the legacy MR-DVR network;

allocating, by the MR-DVR server device, network resources for content delivery sessions between a UPnP media server and a legacy MR-DVR client;

converting, by the MR-DVR server device, a transport mechanism to legacy MR-DVR media transport; and providing, by the MR-DVR server device, the legacy MR-DVR client with network information.

9. The method of claim 8, wherein converting the transport mechanism to the legacy MR-DVR media transport comprises converting a RTP transport mechanism.

10. The method of claim 8, wherein converting the transport mechanism to legacy MR-DVR media transport comprises converting a HTTP transport mechanism.

11. The method of claim 9, wherein converting the RTP transport mechanism to the legacy MR-DVR media transport comprises providing trick mode capability.

12. The method of claim 10, wherein converting the HTTP transport mechanism to the legacy MR-DVR media transport comprises providing trick mode capability.

13. The method of claim 8, wherein providing the legacy MR-DVR client with network information comprises:
   providing discovered UPnP device information; and
   providing service description information.

14. The method of claim 7, wherein transmitting, by the MR-DVR server device, the QAM modulated signals encoded with the first UPnP information comprises transmitting the first UPnP information from the MR-DVR server device over a network to a MR-DVR client.

15. The method of claim 7, wherein the network comprises a coaxial cable home network.

16. The method of claim 7, wherein transmitting the first UPnP information from the MR-DVR server device comprises transmitting the first UPnP information from the MR-DVR server device located within a home network.

17. The method of claim 7, wherein transmitting, by the MR-DVR server device, the first UPnP information comprises transmitting the first UPnP information to a MR-DVR client located at a customer's premises.

18. A system for communicating UPnP information comprised of:
   a network;
   a MR-DVR server device configured to request mapping of UPnP SRS actions based on a pre-defined profile comprising a unique ID having mapping return parameters for use by a MR-DVD client; and
   the MR-DVR client configured to:
      receive QAM modulated signals encoded with first UPnP information from the MR-DVR server device over the network,
      receive the pre-defined profile comprising, and
      transmit a QPSK modulated signal encoded with second UPnP information to the MR-DVR server device over the network.

19. The system of claim 18, wherein the MR-DVR server device is further configured to route data traffic between a network device and a MR-DVR legacy network.

20. The system of claim 19, wherein the MR-DVR server device is configured to route the data traffic between the network device and a MR-DVR legacy network comprises the MR-DVR server device being further configured to:
   translate between a UPnP content directory service message and a legacy MR-DVR message;
   translate between a UPnP scheduled recording service message and the legacy MR-DVR message;
   set up an AV streaming session over a network segment wherein the network device is operably connected to the network segment;
   set up the AV streaming session over the legacy MR-DVR network;
   allocate network resources for the AV streaming sessions between a UPnP media server and a legacy MR-DVR client;
   convert a transport mechanism to a legacy MR-DVR media transport; and
   provide the legacy MR-DVR client with network information.

21. The system of claim 20, wherein the MR-DVR server device is configured to convert the transport mechanism to the legacy MR-DVR media transport comprises the MR-DVR being further configured to convert a RTP transport mechanism to the legacy MR-DVR media transport.

22. The system of claim 20, wherein the MR-DVR server device is configured to convert the transport mechanism to the legacy MR-DVR media transport comprises the MR-DVR being further configured to converting a HTTP transport mechanism.

23. The system of claim 21, wherein the MR-DVR server device is configured to convert the RTP transport mechanism to the legacy MR-DVR media transport comprises the MR-DVR being further configured to provide trick mode capability.

24. The system of claim 22, wherein the MR-DVR server device is configured to convert the HTTP transport mechanism to the legacy MR-DVR media transport comprises the MR-DVR server device being further configured to provide trick mode capability.

25. The system of claim 20, wherein the MR-DVR server device is configured to provide the legacy MR-DVR client with the network information comprises the MR-DVR server device being further configured to:
   provide discovered UPnP device information; and
   provide service description information.

26. The system of claim 18, wherein the MR-DVR server device decodes the QPSK modulated signal to retrieve the second UPnP information and the MR-DVR server device encodes the first UPnP information to the QAM modulated signal.

27. The system of claim 18, wherein the MR-DVR client decodes the QAM modulated signals to retrieve the first UPnP information and the MR-DVR client encodes the second UPnP information to the QPSK modulated signal.

28. The system of claim 18, wherein the network is a home network.

29. The system of claim 18, wherein the MR-DVR server device is located within the home network.

30. The system of claim 18, wherein the MR-DVR client is located at a customer's premises.

31. A MR-DVR client device comprising:
   a processor, wherein the processor is configured to:

receive a QAM modulated signal encoded with first UPnP information and a pre-defined profile, wherein the pre-defined profile comprises a unique ID having mapping return parameters for use by the MR-DVD client;

transmit a QPSK modulated signal encoded with second UPnP information; and transmit mapping information for UPnP SRS actions based on the pre-defined profile and return parameters.

32. A MR-DVR server device comprising:

a processor, wherein the processor is configured to:

transmit a QAM modulated signal encoded with first UPnP information and a pre-defined profile, wherein the pre-defined profile comprises a unique ID having mapping return parameters for use by the MR-DVD client;

receive a QPSK modulated signal encoded with second UPnP information;

route data traffic between a network device and a MR-DVR client device; and request mapping of UPnP SRS actions based on the pre-defined profile and return parameters.

* * * * *